W. J. PAYNE.
NUTCRACKER.
APPLICATION FILED SEPT. 19, 1916.
1,225,484.
Patented May 8, 1917.
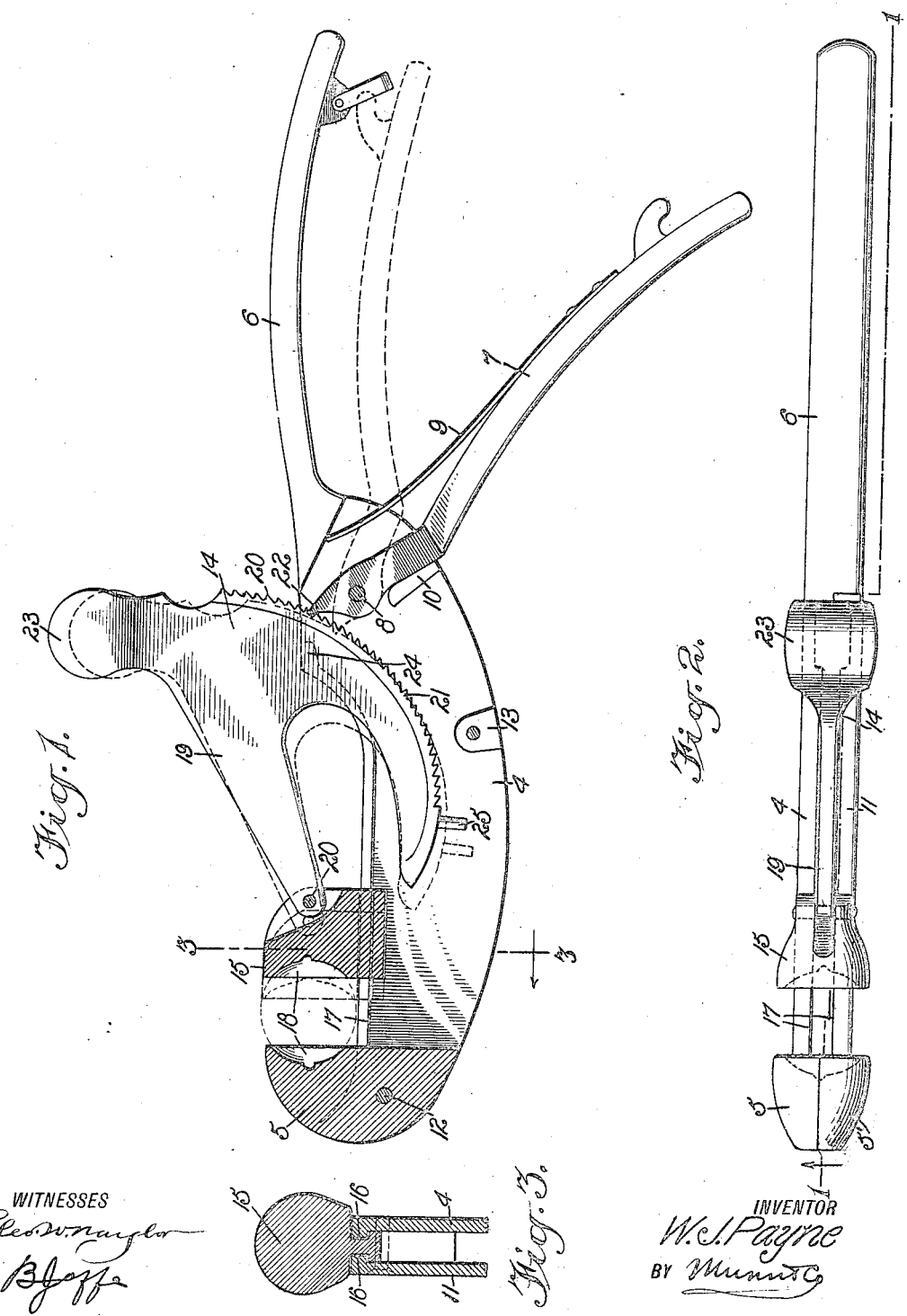
WITNESSES
INVENTOR
W. J. Payne
BY
ATTORNEYS

UNITED STATES PATENT OFFICE.

WILLIAM JOHNSON PAYNE, OF PANTHER BURN, MISSISSIPPI.

NUTCRACKER.

1,225,484.  Specification of Letters Patent.  Patented May 8, 1917.

Application filed September 19, 1916. Serial No. 120,943.

*To all whom it may concern:*

Be it known that I, WILLIAM JOHNSON PAYNE, a citizen of the United States, and a resident of Panther Burn, in the county of Sharkey and State of Mississippi, have invented a new and Improved Nutcracker, of which the following is a full, clear, and exact description.

An object of the invention is to provide a simple, inexpensive and efficient nut cracker with which nuts of various dimensions can be easily and quickly cracked without smashing the kernel but with which the shell of the nut is positively broken open.

Another object of the invention is to provide a nut cracker of comparatively small dimensions so that the same can be used at a dinner table and which will crack nuts with comparatively small effort.

The device is characterized by a movable jaw actuated through the medium of a cam by one of the handles of the device. This structure adapts the device for use as a wrench as well as a nut cracker and, therefore, although the description and disclosure therein relate to a nut cracker it must be understood that the structure disclosed and claimed is not limited to a nut cracker.

Reference is to be had to the accompanying drawings forming part of this specification, in which like characters indicate corresponding parts in all the views.

Figure 1 is a vertical section on line 1—1, Fig. 2;

Fig. 2 is a top plan view; and

Fig. 3 is a cross section on line 3—3, Fig. 1.

Referring to the drawings, 4 is the main body of the device which is elongated and terminates at one end with a rising portion 5 forming a section of the stationary jaw. The other end of the main body terminates in a handle 6 with which coöperates a similar handle 7 pivoted to the main body by a pin 8 adjacent the handle 6. A spring 9 is secured to the handle 7 to engage the handle 6 at its juncture with the body 4 for moving said handle 7 away from the handle 6. The movement of the handle 7 from the handle 6 is limited by a projection 10 formed on the main body 4.

Coöperating with the main body 4 is a plate 11 having the same elongated shape as the main body and terminating at one end in a projection 5′ similar to 5 and therewith complementing the main body to form the stationary jaw. The other end of said plate abuts against the portion of the handle 6 which is raised above the main body 4. The outer surface of the plate and the handle are flush. The plate 11 is maintained rigidly against the body 4 by screws 12 or rivets, lugs 13 being provided on the body and the plate to maintain the proper clearance therebetween for the handle, the cam plate 14 and the movable jaw 15.

The movable jaw 15 is engaged between the body and the plate 11 and is mounted to slide on the straight edge formed by the body and plate. Said jaw has undercut grooves 16 which are engaged by the inwardly raised edges 17 of the main body 4 and plate 11, whereby the jaw 15 is free to slide only to and from the fixed jaw 5 and 5′. The two jaws have preferably concave engaging surfaces 18 facilitating the gripping of a nut therebetween.

The cam plate 14 has an arm 19 the end of which is connected to the movable jaw 15 by a pivot 20. The cam 14 presents an arcuated surface 21 to the end 22 of the handle 7 with which it coöperates. Preferably the arcuated surface is dented so as to be engaged by the properly formed edge of the end 22 of the handle 7. Gravity normally maintains the rigid surface of the cam in engagement with the end 22 of the handle 7. When the jaw 15 is to be moved away from the fixed jaw 5, the cam plate 14 is picked up by a head 23 to bring the curved edge 21 of the cam plate away from the end 22 of the handle 7, the plate swinging on the pivot 20. A too great movement of the curved edge from the end 22 of the handle 7 is prevented by a lug 24 forming an extension of the raised edge 17. A tongue 25 is provided at the end of the arcuated surface of the cam to prevent the pulling out of the end of the cam from between the main body and plate 11.

When a nut is to be cracked with the device, the head 23 of the cam plate is grasped, whereby the movable jaw 15 is moved away from the fixed jaw 5. A nut is then introduced between the jaws and the cam plate is forced downwardly until the movable jaw is stopped by the nut located between the jaws. By grasping the two handles 6 and 7 and forcing the handle 7 toward the handle 6 the end 22 is made to engage the ratchet surface of the cam, binding the same and thereby forcing the movable jaw toward the fixed jaw and, consequently, cracking the nut therebetween.

It will be noted that the movement of the cam plate and, therefore, the movable jaw 15 is limited by the sweep of the handle 7. This displacement is of such a length as to insure a positive cracking of the nut shell without crushing the kernel. The curvature of the ratchet surface is such that the displacement of the movable jaw at any position of the cam plate is substantially constant. The point of engagement between the end 22 of the handle 7 with the ratchet surface is on a line substantially parallel with the surface which guides the movable jaw 15 when the maximum strain is applied. That is to say, the initial pressure takes place on a line slightly inclined to the surface which guides the movable jaw. As the resistance increases the line of action of the pressure becomes more and more parallel to the direction of motion of the jaw 15.

While I have described the principle of operation, together with the device which I now consider to be the best embodiment thereof, I desire to have it understood that the device shown is merely illustrative and that such changes may be made as are within the scope of the appended claims.

I claim:

1. In a device of the class described, a fixed jaw, a movable jaw, a cam plate pivotally connected to the movable jaw and whereby said movable jaw can be moved to and from the fixed jaw, and operating means connected to the fixed jaw for engaging the cam plate at any position thereof and move the same through a predetermined limited distance toward the fixed jaw by a complete displacement of said operating means, substantially as and for the purpose set forth.

2. In a device of the class described, a fixed jaw, a movable jaw, a cam plate presenting an arcuated ratchet surface and having an arm in pivotal connection with the movable jaw, and means in pivotal connection with the fixed jaw for engaging said ratchet surface of the cam at any position thereof whereby a predetermined limited movement may be imparted to the movable jaw toward the fixed jaw by a complete movement of said means, substantially as and for the purpose set forth.

3. In a device of the class described, a fixed jaw, a movable jaw, a cam plate presenting an arcuated ratchet surface having an arm in pivotal connection with the movable jaw, and a first-class level mounted on the fixed jaw and having means for engaging the ratchet surface of the cam and whereby a limited displacement may be imparted to the movable jaw toward the fixed jaw.

4. In a device of the class described, a fixed jaw, a movable jaw, a cam plate presenting an arcuated ratchet surface and pivotally connected to the movable jaw, and a first-class lever on the fixed jaw for engaging the ratchet surface at any position of the movable jaw to impart a limited displacement to said movable jaw toward the fixed jaw.

5. In a device of the class described, a body portion presenting a fixed jaw, a jaw movable on the body to and from the fixed jaw, a cam plate pivoted to said movable jaw to swing in the body, a lever of the first class pivoted to the body to move into the path of the cam plate, said cam plate presenting an arcuated ratchet surface to the lever to be engaged thereby and whereby a limited movement may be imparted to the movable jaw toward the fixed jaw by said lever, the arcuated ratchet surface of said cam being so formed that the displacement imparted to the movable jaw by the lever is substantially constant at any position of the movable jaw relative to the fixed jaw.

WILLIAM JOHNSON PAYNE.

Witnesses:
W. P. SHACKLEFORD, Jr.,
D. C. SHARKEY.

Copies of this patent may be obtained for five cents each, by addressing the "Commissioner of Patents, Washington, D. C."